(12) United States Patent
Kim

(10) Patent No.: US 7,339,886 B2
(45) Date of Patent: Mar. 4, 2008

(54) SYSTEM AND METHOD FOR SYNCHRONIZING SGSNS AND A GGSN

(75) Inventor: Tae Yong Kim, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 929 days.

(21) Appl. No.: 10/641,298

(22) Filed: Aug. 15, 2003

(65) Prior Publication Data

US 2004/0190530 A1    Sep. 30, 2004

(30) Foreign Application Priority Data

Aug. 16, 2002    (KR) .................. 10-2002-0048382

(51) Int. Cl.
*H04J 3/06* (2006.01)
*H04L 12/26* (2006.01)
*H04L 12/66* (2006.01)
*H04Q 7/20* (2006.01)
*G06F 15/16* (2006.01)

(52) U.S. Cl. .............. 370/216; 370/338; 370/349; 370/350; 370/401; 709/203; 709/224; 709/248

(58) Field of Classification Search ............ 370/216, 370/338, 349, 350, 401; 709/204, 224, 248
See application file for complete search history.

(56) References Cited

U.S. PATENT DOCUMENTS

| 5,966,378 | A  | * | 10/1999 | Hamalainen ............ 370/348 |
| 6,195,705 | B1 | * | 2/2001  | Leung ................... 709/245 |
| 6,466,556 | B1 | * | 10/2002 | Boudreaux ............. 370/331 |
| 6,487,605 | B1 | * | 11/2002 | Leung ................... 709/245 |
| 6,714,784 | B1 | * | 3/2004  | Forssell et al. ......... 455/436 |
| 2002/0091860 | A1 | * | 7/2002 | Kalliokulju et al. ..... 709/247 |

* cited by examiner

*Primary Examiner*—Alpus H. Hsu
(74) *Attorney, Agent, or Firm*—Ked & Associates, LLP

(57) ABSTRACT

A system and method for synchronizing SGSNs and GGSN in a mobile communication system that guarantees synchronization until a malfunction, if any, in an NTP server is cured. If malfunction occurs in the NTP server and an associated range, the NTP server is changed upon monitoring the malfunction and the changed NTP server distributes a timestamp information until the NTP server experiencing the malfunction is restored, thereby guaranteeing synchronization between the SGSNs and the GGSN.

18 Claims, 9 Drawing Sheets

Fig. 2
(Prior Art)

| 0 | 8 | | 16 | 24 | 31 |
|---|---|---|---|---|---|
| LI | VN | Mode | Stratum | Poll | Precision |
| Root Delay (32) ||||||
| Root Dispersion (32) ||||||
| Reference Identifier (32) ||||||
| Reference Timestamp (64) ||||||
| Originate Timestamp (64) ||||||
| Receive Timestamp (64) ||||||
| Transmit Timestamp (64) ||||||
| Authenticator(optional) (96) ||||||

Fig. 5a

| 1(Byte) | 2 | 3 | 4 |
|---|---|---|---|
| Transmit time | | | |
| Occur Time | | | |
| IP Address | | | |
| Message Type | | | |

Fig. 5b

| 1(Byte) | 2 | 3 | 4 |
|---|---|---|---|
| IP Address | | | |
| Message Type | | | |

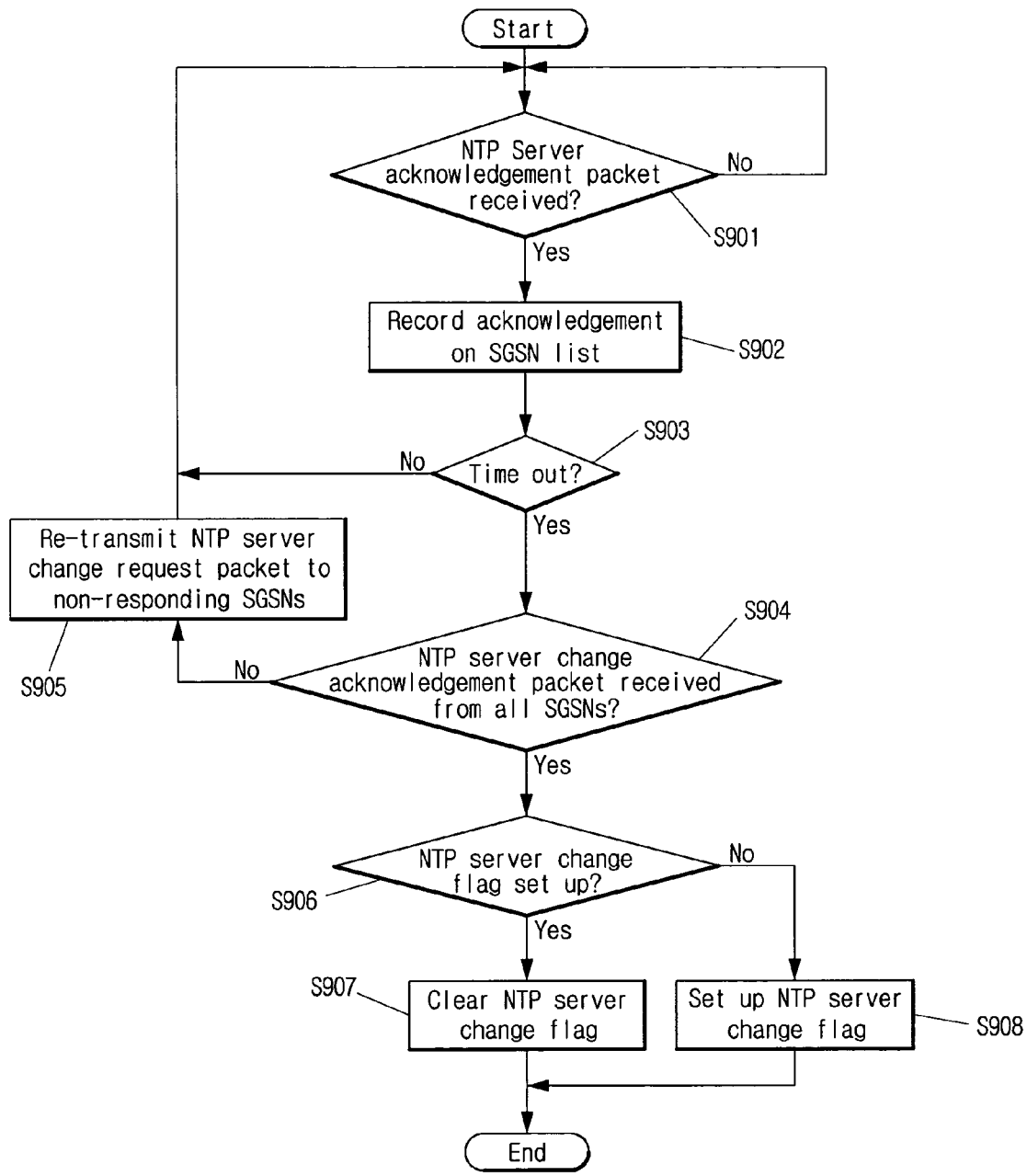

SYSTEM AND METHOD FOR SYNCHRONIZING SGSNS AND A GGSN

BACKGROUND OF THE INVENTION

1. Field of the Invention

The present invention generally relates to a communications system, and more specifically to a system and method for synchronizing nodes in a mobile communications system.

2. Background of the Related Art

Recently, the International Mobile Telecommunication (IMT)-2000 standard has been introduced as one of the Future Public Land Mobile Telecommunication Systems (FPLMTS). Through this standard, the communication of voice, data or other types of information is made possible with one mobile terminal anywhere and anytime around the world. In terms of the IMT-2000 network, Internet data transmission is made to mobile terminals (MTs) through a packet switching device for Global System for Mobile Communications (GSM) packet service (i.e., an SGSN) and through a gateway inter-working with the packet network (i.e., a GGSN).

In order to provide a General Packet Radio Service (GPRS) for subscribers, serving GPRS Support Nodes (SG-SNs) record location information of relevant mobile terminals and conduct subscriber authentication and the matching with the Gateway GPRS Support Node (GGSN). The GGSN assigns IP addresses to the mobile terminal requesting packet service, transfers packet data coming from the SGSN to the outside packet network such as the Internet, and transfers packet data coming from the outside to the relevant mobile phone. For the inter-working of SGSNs and a GGSN having the above-described features, the SGSNs and the GGSN need to be synchronized.

FIG. 1 illustrates a synchronizing system of SGSNs and a GGSN in the prior art. This system comprises network time protocol (NTP) server 10 which distributes a timestamp to the entire network, a GGSN 20, and a number of SGSNs 30 which receive the timestamp from the NTP server 10. The GGSN and SGSNs are synchronized by receiving the timestamp distributed by the NTP server.

The GGSN 20 comprises a GGSN-System Management Processor (G-SMP) 21 and a GGSN-Interface (G-Interface) 23. The G-SMP 21 manages the repair and maintenance of the switching device at the GGSN side. Also, the G-SMP comprises a GGSN-NTP Client (G-NTP Client) 22, which transmits NTP request packets to the NTP server 10 and receives NTP acknowledgement packets from the NTP server, thus receiving the timestamp.

The G-Interface serves as an interface between the NTP server and the GGSN through the Transmission Control Protocol/Internet Protocol (TCP/IP) communication. The SGSN comprises an SGSN-System Management Processor (S-SMP) 31 and an SGSN-Interface (S-Interface) 33. The S-SMP manages the repair and maintenance of the switching device at the SGSN side. Also, the S-SMP comprises an SGSN-NTP Client (S-NTP Client) 32, which transmits NTP request packets to the NTP server 10 and receives NTP acknowledgement packets from the NTP server thus receiving the timestamp. The S-Interface serves as an interface between the NTP server and the SGSN through the TCP/IP communication. The G-Interface and S-Interface may be an Ethernet Port or Fast Ethernet Subscriber Front Assembly (FESFA) interface.

FIG. 2 shows the structure of the NTP request packet and the NTP acknowledgement packet according to the prior art.

FIG. 3 shows a prior-art method for synchronizing SGSNs and a GGSN. First, when an NTP Client starts operation, it creates a User Datagram Protocol (UDP) socket in order to use the Ethernet port connected to the SMP. In other words, at the time of initial operation, the G-NTP Client 22 of the GGSN 20 and the S-NTP Client 32 of the SGSN 30 create UDP sockets to use the G-Interface 23 and the S-Interface 33 connected to the G-SMP 21 and S-SMP 31, respectively (S301).

Then, the G-NTP Client and the S-NTP Client set up NTP request packets of the NTP packet format as illustrated in FIG. 2 (S302). When setting up NTP request packets, the NTP Client specifies the mode of the NTP packet as "Client Mode" and specifies the destination port and the source port with different numbers. For example, the destination port may be No. 123 and the source port may be No. 3000. The reason why the Client Mode is manifested is to be able to receive a timestamp from the NTP server 10. The destination port and the source port are specified with different numbers in order to operate the NTP packet either as client mode or as server mode.

Thereafter, the G-NTP Client 22 and the S-NTP Client 32 transmit the above-mentioned NTP request packets to the NTP server 10 through the UDP sockets (S303). Then, the NTP server receives the NTP request packets, sets up NTP acknowledgement packets to distribute timestamp to the G-NTP Client 22 and the S-NTP Client 32, and transmits the NTP acknowledgement packets to the G-NTP Client 22 and the S-NTP Client 32.

The G-NTP Client and the S-NTP Client receives NTP acknowledgement packets from the NTP server (S304) and reviews the received NTP acknowledgement packets to determine the validity of the received timestamp (S305). In other words, upon receiving NTP acknowledgement packets from the NTP server, the G-NTP Client and the S-NTP Client conduct procedures to set up a timestamp pursuant to the procedures recommended in "RFC 959." For this purpose, version and mode, etc., of the NTP acknowledgement packets are reviewed to determine whether the versions are the same and whether the mode is the server mode.

After said review process (S305), if it is determined that the received NTP acknowledgement packets are not valid (i.e., if the versions are not identical or if the mode is not the server mode), the G-NTP Client 22 and the S-NTP Client 32 wait for the polling time (S306) and returns to the step of NTP request packet setup (S302).

On the other hand, after the review process (S305), if it is determined that the received NTP acknowledgement packets are valid (i.e., the versions are identical and the mode is the server mode), the G-NTP Client 22 and the S-NTP Client 32 set up the time of the SMP using the timestamp of the NTP acknowledgement packets. Specifically, the time of the G-SMP 21 and the time of the S-SMP 31 are set up upon adding local time differences to the timestamp of the NTP acknowledgement packets, respectively. In this manner, the time of GGSN 20 and the time of SGSN 30 are set up (S307). The above time conversion of adding a relevant local time difference is conducted because the timestamp of the NTP acknowledgement packet is a standard time which is the same regardless of the relevant local time difference.

The G-NTP Client 22 and the S-NTP Client 32 determine whether the time of the G-SMP 21 and the time of the S-SMP 31 have been synchronized with the time of the NTP server 10 (S308).

Upon the above determination (S308), if the synchronization has been accomplished, the G-NTP Client 22 and the S-NTP Client 32 are synchronized with the time of the NTP server 10, respectively. Accordingly, the G-NTP Client 22 and the S-NTP Client 32 are synchronized with each other. Thus, the synchronization step is completed.

On the other hand, if the above determination process (S308) shows that the synchronization has not been accomplished, the G-NTP Client 22 and the S-NTP Client 32 wait for the polling time (S306) and then return to the step of NTP request packet set up (S302).

In the above-described system for synchronizing SGSNs and a GGSN of the prior art, if the NTP server experiences a malfunction, the GGSN and the SGSNs must operate on their own time frames. If the NTP server's malfunction continues, the time variation between the GGSN and the SGSNs becomes greater and greater. Thus, the SGSNs and the GGSN may not operate in a synchronized manner.

Further, if the GGSN experiences a malfunction the SGSNs and the GGSN would not be synchronized, because the GGSN would not be able to maintain the synchronization with the NTP server while the SGSNs would be synchronized with the NTP server.

Also, if any specific SGSN among multiple SGSNs experiences a malfunction, the other SGSNs, the GGSN and the NTP server would be synchronized but the SGSN experiencing the malfunction would not be synchronized with the other nodes (i.e., the other SGSNs, the GGSN and the NTP server). Consequently, there would be serious problems in the inter-operation of the SGSNs and the GGSN for time-related functions such as authentication and packet exchange.

SUMMARY OF THE INVENTION

An object of the invention is to solve one or more of the above problems and/or disadvantages of the prior art and to provide at least one of the advantages described hereinafter.

Another object of the present invention is a system and method for guaranteeing synchronization between a GGSN and one or more SGSNs when a malfunction occurs in the NTP server, accomplished by conducting a malfunction monitoring process and changing an NTP server.

In order to achieve these and other objects and advantages, the present invention provides in accordance with one embodiment a system for synchronizing SGSNs and GGSN comprising: a GGSN that detects any malfunction occurring in the NTP server and the relevant range, requests the NTP server change, and distributes timestamp until the malfunction is cured; and multiple SGSNs that detect malfunctions occurring in the NTP server and the relevant range, change the NTP server to the GGSN according to the GGSN's NTP server change request, and receive timestamp from the GGSN.

Preferably, the GGSN comprises: G-Interface that conducts interface with each of the SGSNs through TCP/IP communication; and G-NTP Client that detects malfunction in the NTP server and the relevant range and then transmits NTP server change request packets to the SGSNs through the G-Interface, and conducts synchronization with each of the SGSNs by distributing timestamp to the SGSNs through the G-Interface.

Preferably, the NTP server change request packet comprises: packet transmission time field indicating the time when the G-NTP Client transmitted packets; malfunction occurrence/cure time indicating the time when the malfunction occurred in the NTP server and was cured; IP address field indicating the IP address of a node to be used as the NTP server; and message type field indicating that the packet transmitted by the G-NTP Client is an NTP server change request.

Preferably, each of the SGSNs comprises: S-Interface that conducts interface with the GGSN or the other SGSNs through TCP/IP communication; and S-NTP Client that detects malfunction in the NTP server and the relevant range, changes the NTP server to the GGSN upon receiving the NTP server change request from the GGSN through the S-Interface and then transmits an NTP server change acknowledgement packet, and conducts synchronization with the GGSN by receiving the timestamp distributed by the GGSN.

Preferably, the NTP server change acknowledgement packet comprises: IP address field indicating the IP address of the changed NTP server; and message type field indicating that the packet transmitted by the S-NTP Client is an NTP server change response.

Preferably, if the S-NTP Client detects any malfunction in the NTP server or in the GGSN, the S-NTP Client conducts the function of an NTP server according to certain priority and, thus, it makes the NTP server change requests to the other SGSNs through the S-Interface, conducts synchronization with the other SGSNs by distributing timestamp to the other SGSNs through the S-Interface. If the malfunction in the NTP server or in the GGSN is cured, the S-NTP Client receives timestamp from the recovered NTP server or the GGSN through the S-Interface and thus conducts synchronization with the recovered NTP server or the GGSN.

A method for synchronizing GGSN and SGSNs according to one embodiment of the present invention comprises: requesting NTP server change upon detecting malfunction in the NTP server and the relevant range; and changing the NTP server upon the NTP server change request and receiving timestamp from the changed NTP server, thus synchronizing the GGSN and the SGSNs.

Preferably, requesting of NTP server change comprises: detecting malfunction in the NTP server and the relevant range or detecting cure of the malfunction; if any malfunction in the NTP server and the relevant range has been detected, confirming that the NTP server change flag has not been set up and then checking whether the malfunction continues for certain pre-determined duration; if the malfunction continues for the pre-determined duration, setting up the first NTP server change request packet and making the SGSN list by searching database; and transmitting the first NTP server change request packet to each of the SGSN on the list and then setting up time signal.

Preferably, the first NTP server change request packet is a packet for requesting change of the NTP server to the GGSN, comprising: packet transmission time field indicating the time when the GGSN transmitted a packet; malfunction occurrence time field indicating the time when the malfunction occurred in the NTP server; IP address field indicating the IP address of the GGSN; and message type field indicating that the packet transmitted by the GGSN is for an NTP server change request.

Alternatively, requesting of NTP server change comprises: if any malfunction in the NTP server and the relevant range has been detected, confirming that the NTP server change flag has been set up and then setting up the second NTP server change request packet; and making a list of SGSNs by searching database and then transmitting the second NTP server change request packet to each of the SGSNs on the list and setting up time signal at the same time.

Preferably, the second NTP server change request packet is a packet for requesting the NTP server change from the GGSN back to the original NTP server, comprising: packet transmission time field indicating the time when the GGSN transmitted the packet; malfunction cure time field indicating the time when the malfunction in the NTP server was resolved; IP address field indicating the IP address of the NTP server; and message type field indicating that the packet transmitted by the GGSN is an NTP server change request packet.

Synchronizing the GGSN and the SGSNs comprises: checking at each SGSN the NTP server change request packet received from the GGSN; determining whether the packet transmission time and the malfunction occurrence/cure time included in the NTP server change request packet is earlier than the transmission time of the final NTP packet or not; changing the NTP server to the GGSN or the original NTP server corresponding to the IP address set forth in the NTP server change request packet and, at the same time, setting up an NTP server change acknowledgement packet and transmitting it to the GGSN or the original NTP server changed as the NTP server, corresponding to the IP address set forth in the NTP server change request packet; and receiving timestamp distributed by the GGSN or the original NTP server changed as the NTP server, thus synchronizing the GGSN and the SGSNs.

The NTP server change acknowledgement packet comprises: IP address field indicating the IP address of the GGSN or the NTP server; and message type field indicating that the packet that each SGSN transmits is for an NTP server change acknowledgement.

Alternatively, synchronizing the GGSN and the SGSNs comprises: if no NTP server change request packet has been received, detecting at each SGSN the occurrence of malfunction in the NTP server and the relevant range or the cure of such malfunction; if any malfunction has been detected in the NTP server and the relevant range, confirming that the NTP server change flag has not been set up and then determining whether the malfunction continues for certain pre-determined time period; if the malfunction continues for certain pre-determined time period, changing the NTP server to the GGSN and, at the same time, setting upon an NTP server change request packet and transmitting it to the GGSN; and receiving the timestamp from the GGSN, thus synchronizing the GGSN and the SGSNs, and then setting up the NTP server change flag.

Synchronizing the GGSN and the SGSNs further comprises: if the cure of the malfunction in the NTP server and the relevant range has been detected, confirming at each SGSN that the NTP server change flag has been set up; changing the NTP server from the GGSN back to the original NTP server and, at the same time, setting up an NTP server change acknowledgement packet and transmitting it to the NTP server; and receiving the timestamp from the NTP server, thus, synchronizing the GGSN and the SGSNs, and then clearing the NTP server change flag.

Synchronizing the GGSN and the SGSNs further comprises receiving at the GGSN the NTP server change acknowledgement packet from each SGSN and thus confirming the NTP server change.

Confirming the NTP server change comprises: after the receipt of the NTP server change acknowledgement packet from each SGSN at the GGSN, recording in the SGSN list whether there has been response from each of the SGSNs; upon confirming the time-out of certain time signal, determining whether the NTP server change acknowledgement packet has been received from every SGSN; if the NTP server change acknowledgement packet has been received from every SGSN, checking whether the NTP server change flag has been set up; and setting up or clearing the NTP server change flag depending on whether the NTP server change flag has been set up.

BRIEF DESCRIPTION OF THE DRAWINGS

FIG. 2 illustrates the prior-art structure of an NTP packet.

FIG. 5a illustrates the structure of an NTP server change request packet according to a preferred embodiment of the present invention.

FIG. 5b illustrates the structure of an NTP server change acknowledgement packet according to a preferred embodiment of the present invention.

FIG. 9 is a flow chart illustrating the NTP server change confirmation of FIG. 6.

DETAILED DESCRIPTION OF PREFERRED EMBODIMENTS

Figure 1:
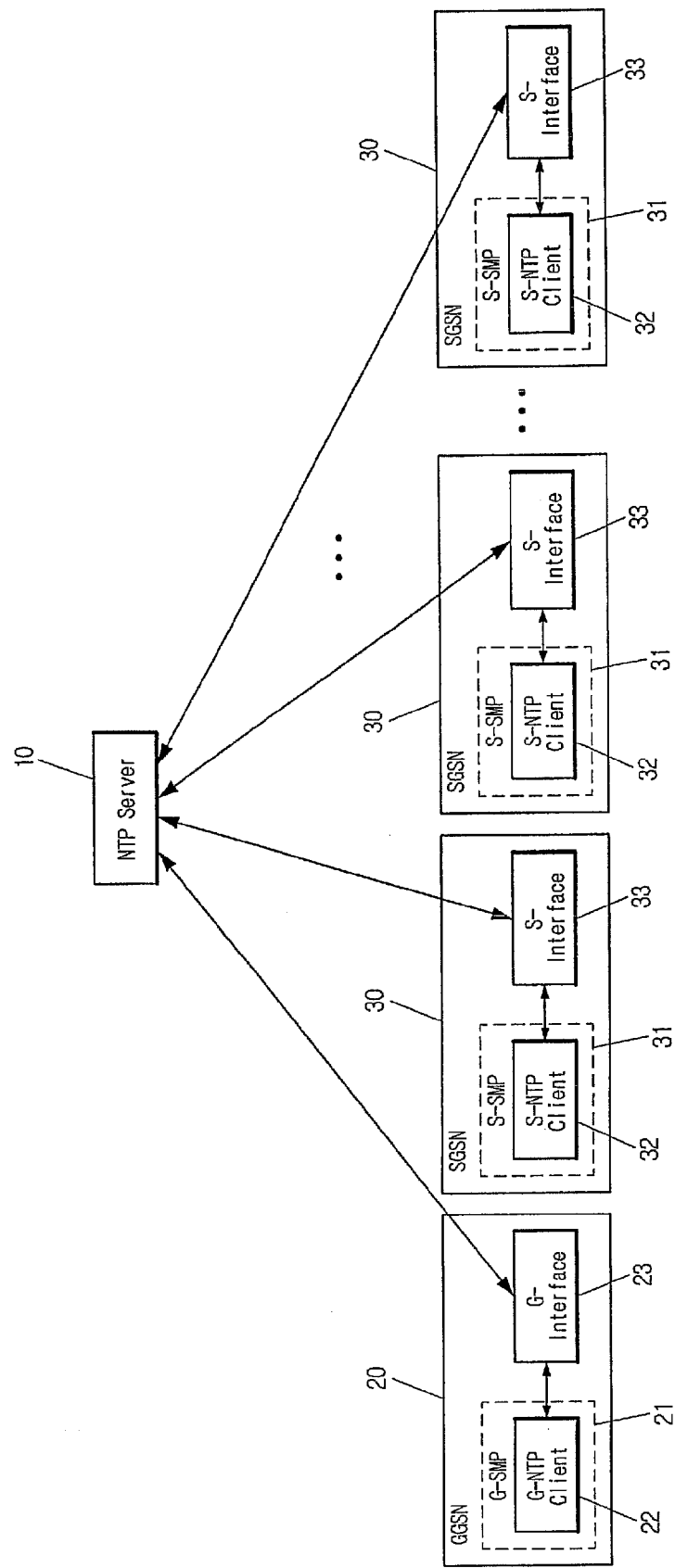
FIG. 1 illustrates a prior-art system for synchronizing SGSNs and a GGSN.
Figure 3:
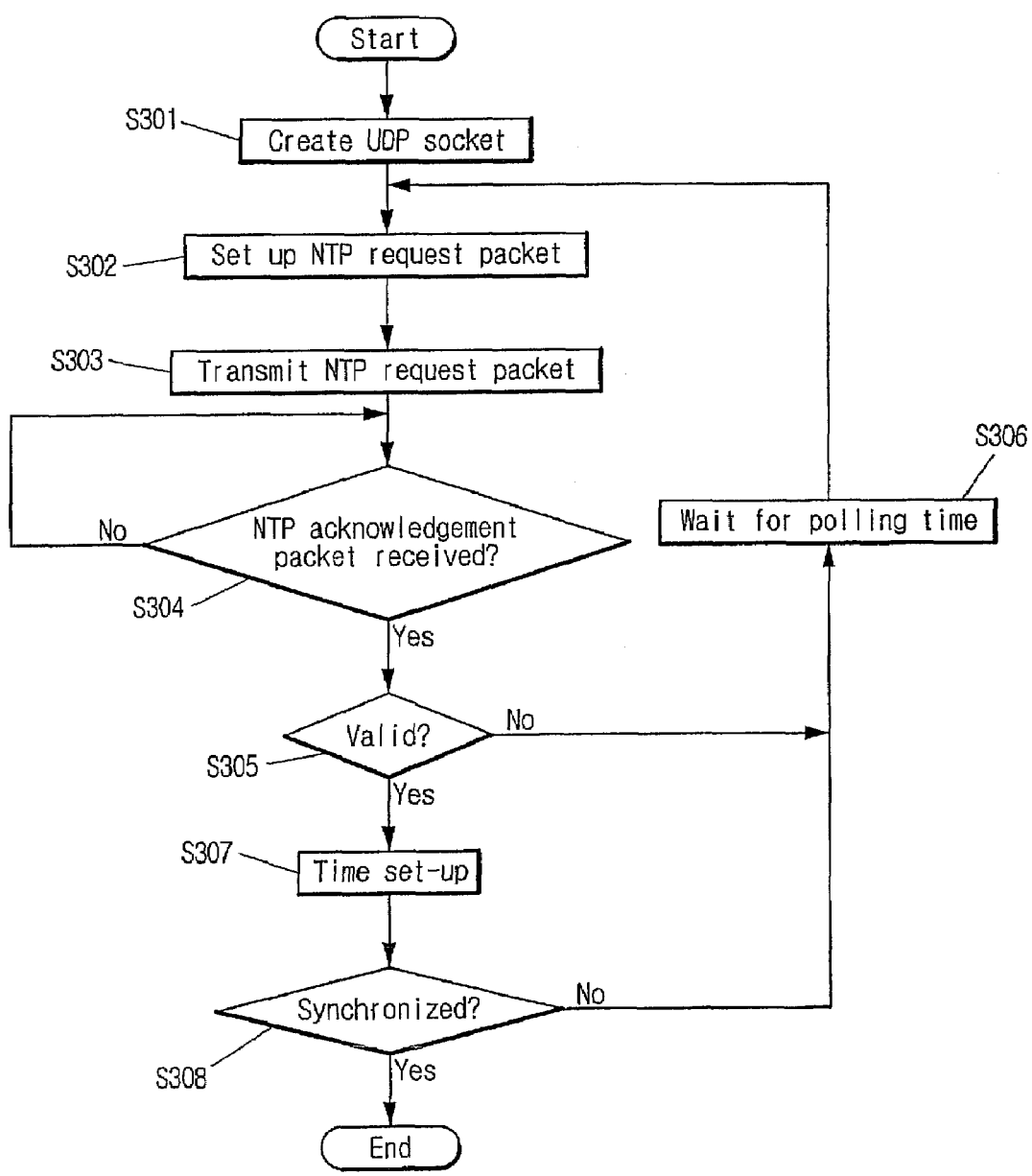
FIG. 3 is a flow chart illustrating the prior-art method for synchronizing SGSNs and a GGSN.
Figure 4:
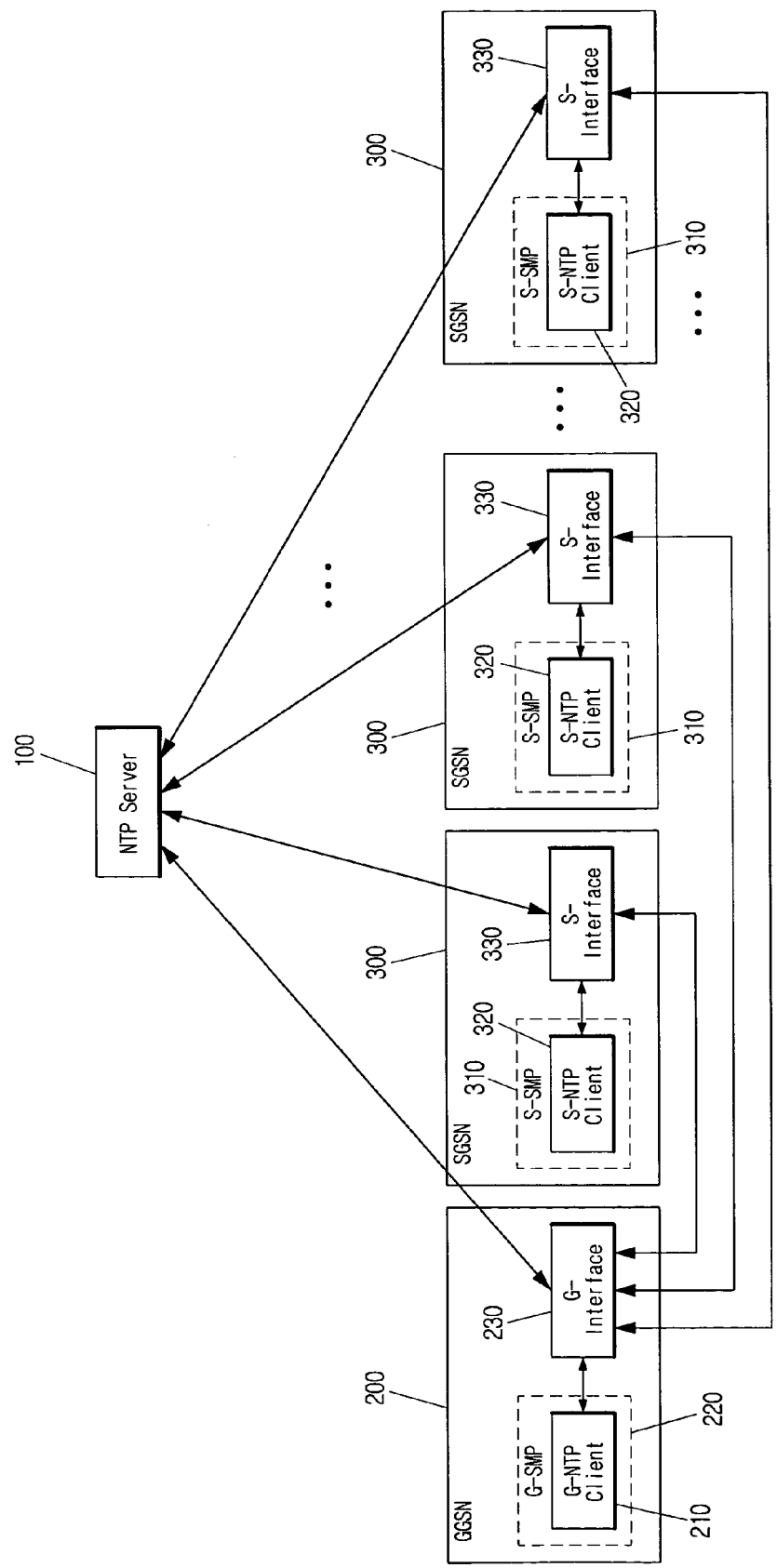
FIG. 4 illustrates a system for synchronizing SGSNs and a GGSN according to a preferred embodiment of the present invention.

FIG. 4 illustrates a system for synchronizing SGSNs and a GGSN according to a preferred embodiment of the present invention. This system includes an NTP server 100, a GGSN 200 and multiple SGSNs 300. The NTP server distributes a timestamp to the entire network. The GGSN makes an NTP server change request depending on whether a malfunction occurs in the NTP server and the relevant range and distributes a timestamp instead of the NTP server until the malfunction is cured. Depending on whether the NTP server and its relevant range experience malfunction or depending on the NTP server change request of the GGSN, each of the SGSNs conducts the NTP server change and receives a timestamp from the current NTP server (e.g., the GGSN 200 or the NTP server 100), thus accomplishing synchronization with the GGSN.

NTP Clients 220 and 320 within SMPs 210 and 310 respectively included in the GGSN 200 and the multiple SGSNs 300 perform the function of operating as the NTP server depending on the malfunction situation. Hereinafter, a preferred embodiment of the present invention where G-NTP Client 320 of G-SMP 210 within the GGSN 200 operates as the NTP server in the case where the NTP server 100 experiences malfunction and an example where the NTP server 100 with the malfunction is cured will be explained. However, the present invention is not to be limited to these examples.

In the case where the system comprises dual NTP servers, if one of the NTP servers experiences a malfunction, the other NTP server may conduct the synchronization operation. Alternatively, if the NTP server and the GGSN experience malfunction at the same time, in the case that the system is implemented with dual GGSNs, the unaffected GGSN may conduct the synchronization. Further, if the NTP server and the GGSN experience malfunction at the same time, one of the multiple SGSNs, selected according to certain order, may conduct synchronization with the other SGSNs, and if the NTP server or the GGSN is recovered the recovered NTP server or GGSN may take over the synchronization.

The GGSN comprises G-SMP 210 and G-Interface 230. The G-SMP manages the repair and maintenance of the switching device of the GGSN. The G-Interface 230 serves as an interface through TCP/IP communications with the G-SMP 210, the NTP sever 100 and the SGSNs 300.

The G-SMP comprises a G-NTP Client 220. The G-NTP Client transmits an NTP request packet to the NTP server 100 and receives an NTP acknowledgement packet from the NTP server, thus taking the timestamp distribution. Further, the G-NTP Client monitors occurrence of a malfunction in the NTP server 100 and the relevant range, transmits an NTP server change request packet to each of the SGSNs 300 through the G-Interface according to the monitored malfunction situation, receives NTP server change acknowledgement packets from the SGSNs 300 through the G-Interface 230, and conducts the operation as an NTP server temporarily until the malfunction is cured, thus distributing timestamp to the SGSNs 300 and accomplishing synchronization with the SGSNs 300.

Each of the SGSNs 300 comprises S-SMP 310 and S-Interface 330. The S-SMP manages the repair and maintenance of the switching device of the SGSN 300. The S-Interface conducts interface through TCP/IP communications with the S-SMP, the NTP server 100, and the GGSN 220.

The S-SMP comprises an S-NTP Client 320. The S-NTP Client transmits an NTP request packet to the NTP server 100 and receives an NTP acknowledgement packet from the NTP server 100, thus taking timestamp distribution. Also, the S-NTP Client 320 receives the NTP server change request packet from the G-NTP Client 220, conducts the NTP server change to the GGSN 200, and transmits an NTP server change acknowledgement packet to the G-NTP Client 220. Otherwise, the S-NTP Client 320 monitors a malfunction in the NTP server 100, conducts the NTP server change to the GGSN 200 depending on the existence of malfunction, thus taking timestamp from the GGSN and accomplishing synchronization with the GGSN 200.

The G-Interface 230 and S-Interface 330 are preferably Ethernet ports or FESFA interfaces. The NTP request packet and the NTP acknowledgement packet may have a format as shown in FIG. 2. The NTP server change request packet and the NTP server change acknowledgement packet are preferably as illustrated in FIGS. 5a and 5b.

As illustrated in FIG. 5a, the NTP server change request packet comprises: packet transmission time field (Transmit Time); malfunction occurrence/cure time field (Occur Time); IP address field (IP Address); and message type field (Message Type). The packet transmission time field indicates the time when the NTP server change request packet was transmitted from the G-NTP Client 220 of the GGSN 200. The malfunction occurrence/cure time field indicates a time when the NTP server 100 experienced a malfunction or when a malfunction was cured. The IP address field indicates an IP address of a node to be used as the NTP server (e.g., the GGSN 200 or the NTP server 100). If the NTP server needs to be changed from the NTP server 100 to the GGSN 200 due to a malfunction in the NTP server 100, the IP address field contains the IP address of the GGSN 200. If the malfunction in the NTP server 100 is cured, the IP address field contains the IP address of the NTP server 100. The message-type field indicates that the packet transmitted by the GGSN 200 is an NTP server change request packet. For example, if the relevant packet is for an NTP server change request, the message-type field is set as "0."

As illustrated in FIG. 5b, the NTP server change acknowledgement packet is a packet transmitted in response to the NTP server change request. The NTP server change acknowledgement packet comprises an IP address field and message type field. The IP address field indicates an IP address of the NTP server requested to be changed to (i.e., the changed NTP server). In correspondence with the IP address in the NTP server change request packet, this IP address field indicates the IP address of the NTP server 100 or the GGSN 200. The message type field indicates that the packet transmitted by the SGSN 300 is an NTP server change acknowledgement packet. For example, if the relevant packet is for an NTP server change response, the message type field is set as "1."

Figure 6:
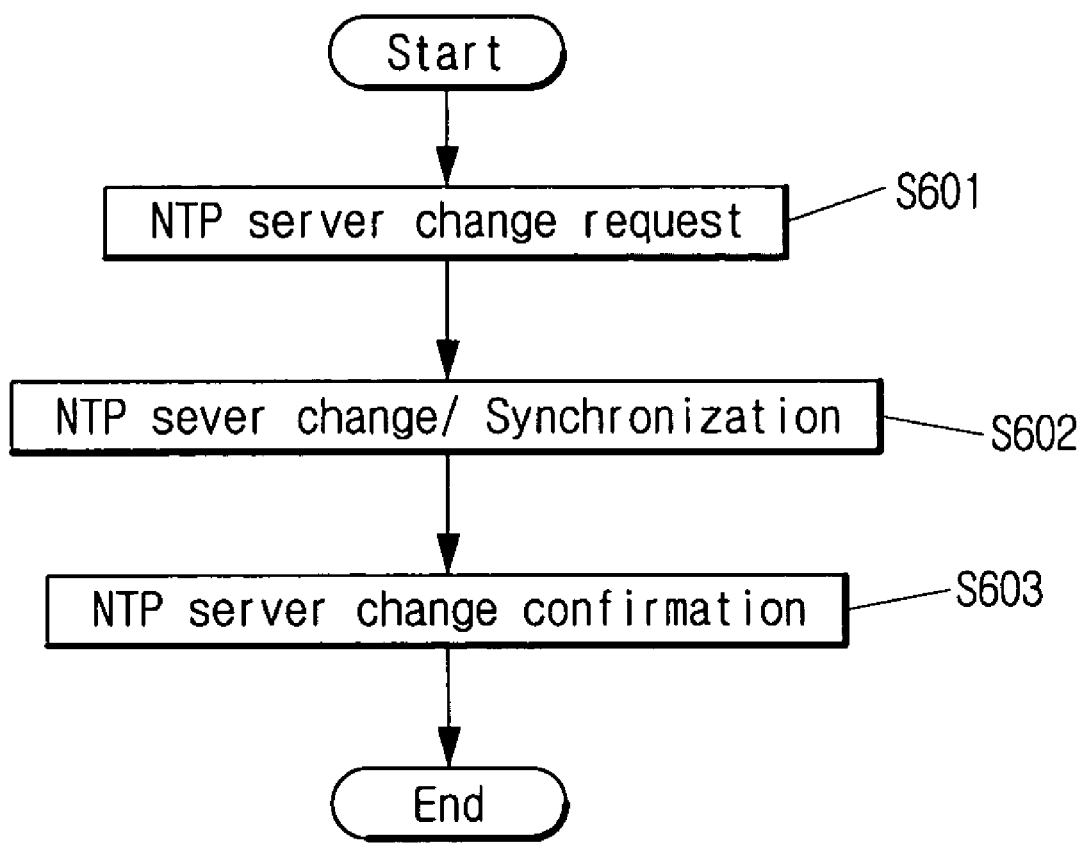
FIG. 6 illustrates a method for synchronizing SGSNs and a GGSN according to a preferred embodiment of the present invention.

FIG. 6 shows a method for synchronizing SGSNs and a GGSN according to a preferred embodiment of the present invention. As a first step, the GGSN 200 monitors malfunction occurrence/cure situation in the NTP server 200 and the relevant range, and depending on the monitored malfunction situation requests the NTP server change by transmitting NTP server change request packets to the multiple SGSNs 300 (S601).

Then, the SGSNs 300 monitor the malfunction occurrence/cure situation in the NTP server 100, or upon receiving the NTP server change request packets from the GGSN 200 transmit NTP server change acknowledgement packets. Depending on the malfunction occurrence/cure situation of the NTP server 100 or depending on the NTP server change request, the SGSNs 300 also change the NTP server.

The new NTP server (i.e., the GGSN 200 or the restored NTP server 100) distributes a timestamp to the SGSNs 300. Each of the SGSNs 300 receives the timestamp distributed from the new NTP server (i.e., the GGSN 200 or the restored NTP server 100), thus accomplishing synchronization with the GGSN 200 (S602).

Thereupon, the GGSN 200 receives NTP server change acknowledgement packets from the SGSNs 300 and thus confirms that the NTP server has been changed to the GGSN 200 or the restored NTP server 100 at each of the SGSNs 300 (S603). The NTP server change at the SGSNs 300 may be either the change to the GGSN 200 or the change to the NTP serve 100.

In the case where the NTP server is changed to the GGSN 200, the SGSNs 300 which before received a timestamp from the NTP server 100 would now receive a timestamp from the GGSN because the malfunction experienced by the NTP server 100. Accordingly, the SGSNs 300 and the GGSN are synchronized at the time of the GGSN 200 and consequently each of the SGSNs 300 would be synchronized with the GGSN 200.

In the case where the NTP server is changed to the NTP server 100, the SGSNs 300 which before received a timestamp from the GGSN 200 would now receive a timestamp from the original NTP server 100 upon curing of the malfunction in the NTP server 100. Accordingly, the SGSNs 300 and the GGSN 200 are synchronized at the time of the restored NTP server 100 and consequently each of the SGSNs 300 would be synchronized with the GGSN 200.

Figure 7:
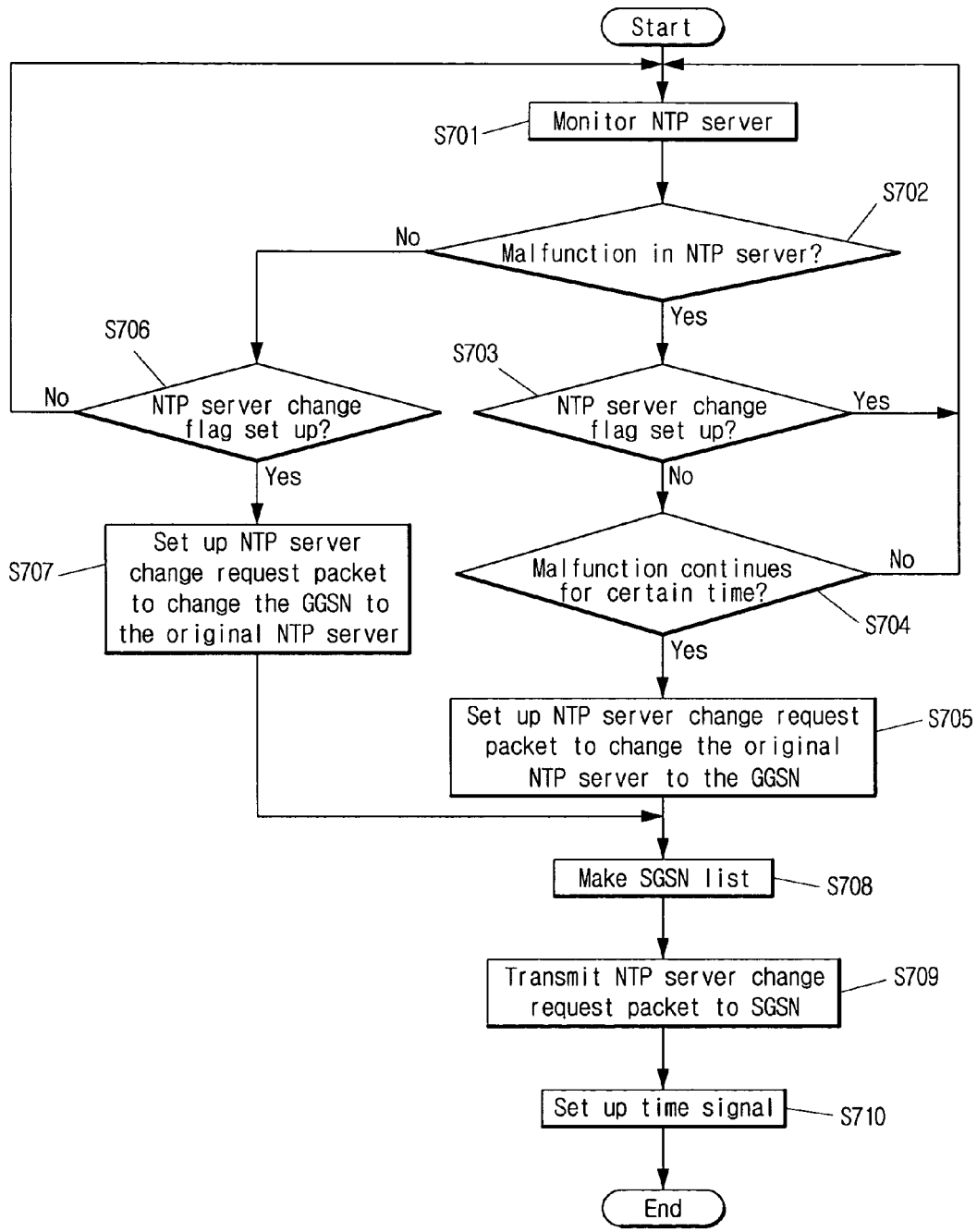
FIG. 7 is a flow chart illustrating the NTP server change request of FIG. 6.

FIG. 7 shows how the NTP server change request may be made at the GGSN 200 (S601). First, the G-NTP Client 220 of the GGSN 200 monitors the NTP server 100 (S701) and determines whether the NTP server 100 has any malfunction or whether the malfunction has been cured (S702).

The NTP server 100 that is monitored by the G-NTP Client 220 performs the function of distributing a timestamp to the GGSN 200 and the multiple SGSN 300 on the entire network. The G-NTP Client 200 monitors the NTP server 100 periodically with the same period as the polling time when the S-NTP Client 320 of each of the SGSNs 300 request timestamp.

Upon the determination (S702), if it is determined that the NTP server 100 is experiencing a malfunction, the G-NTP Client 220 checks whether the NTP server change flag has been set up (S703).

Upon the determination (S703), if the NTP server change flag has been set up, the G-NTP Client 220 returns to the step of NTP server (100) monitoring.

If the NTP server change flag has been set up at the G-NTP Client 220, this means that the G-NTP Client 220 of the GGSN 200 is distributing a timestamp to the SGSNs 300 on the entire network instead of the NTP server 100 experiencing the malfunction.

In other words, because the G-NTP Client 220 is already distributing a timestamp to the SGSNs 300, no further NTP server change request is made to the GGSN. On the other hand, in order to check whether the NTP server 100's malfunction has been cured, the NTP server 100 is periodically monitored.

In contrast, upon the determination (S703), if the NTP server change flag has not been set up, the G-NTP Client 220 determines whether the malfunction in the NTP server 100 continues for certain period of time (S704). This determination is made by increasing the fault count while waiting. If such fault exceeds certain number, it means that the malfunction has continued for certain period of time.

If it is determined in S704 that the malfunction in the NTP server 100 has not continued for certain period of time, the G-NTP Client 220 returns to the step of monitoring the NTP server 100 (S701).

If it is determined in S704 that the malfunction in the NTP server 100 has continued for a certain period of time, the G-NTP Client 220 sets up the first NTP server change request packet in order to change the NTP server experiencing the malfunction to the GGSN 200 (S705).

In other words, the GGSN 200 and the multiple SGSNs 300 are synchronized with each other upon receiving a timestamp from the NTP server 100. If the NTP server 100 experiences a malfunction, the GGSN 200 distributes the timestamp to the SGSNs 300 instead of the NTP server 100. For this purpose, the GGSN 200 sets up the first NTP server change request packet. Preferably, the first NTP server change request packet is set up as illustrated in FIG. 5a. The message type field is set as "0" to indicate that the first NTP server change request packet to be transmitted by the GGSN 200 is for the NTP server change request. The IP address field is set with the IP address of the GGSN 200. The malfunction occurrence/cure time field is set with the time when the malfunction occurred in the NTP server 100. The packet transmission time field is set with the time when the GGSN 200 will send the first NTP server change request packet.

If it is determined in S702 that the malfunction in the NTP server 100 has been cured, the G-NTP Client 220 checks whether the NTP server change flag has been set up (S706).

If it is determined in S706 that the NTP server change flag is not set up, the G-NTP Client 220 returns to the step of monitoring the NTP server 100 (S701). In other words, because the NTP server 100, not the G-NTP Client 200, is distributing the timestamp to the SGSNs 300, the G-NTP Client 220 does not make the NTP server change request to the NTP server 100.

If it is determined in S706 that the NTP server change flag has been set up, this means that the G-NTP Client 220 of the GGSN 200 is still distributing a timestamp to the SGSNs 300 on the entire network even though the NTP server's malfunction has been cured. Thus, the G-NTP Client 220 sets up the second NTP server change request packet in order to change the NTP server back to the original NTP server 100 from the GGSN 200.

In other words, the multiple SGSNs 300 which received a timestamp from the GGSN 200 for synchronization with the GGSN would now be synchronized through the NTP server's time distribution to the GGSN 200 and the SGSNs 300 once the NTP server's malfunction is cured. For this purpose, the second NTP server change request packet is preferably set up as illustrated in FIG. 5a. The message type field is set as "0" to indicate that the second NTP server change request packet to be transmitted by the GGSN 200 is for the NTP server change request. The IP address field is set with the IP address of the NTP server 100. The malfunction occurrence/cure time field is set with the time when the NTP server's malfunction was cured. The packet transmission time field is set with the time when the GGSN 200 will transmit the second NTP server change request packet.

After the NTP server change request packet is set-up (S705, S707), the G-NTP Client 220 generates a list of SGSNs 300 by searching the database (DB) in which the records of the SGSNs 300 are stored (S708).

The G-NTP Client 220 then transmits the first NTP server change request packet or the second NTP server change request packet to the S-NTP Clients 320 of the SGSNs 300 on the SGSN list through the G-Interface 230 (S709). At the same time, the G-NTP Client 220 sets up the time signal of a certain period required for the NTP server change confirmation (S603) in the future (S710).

Figure 8:
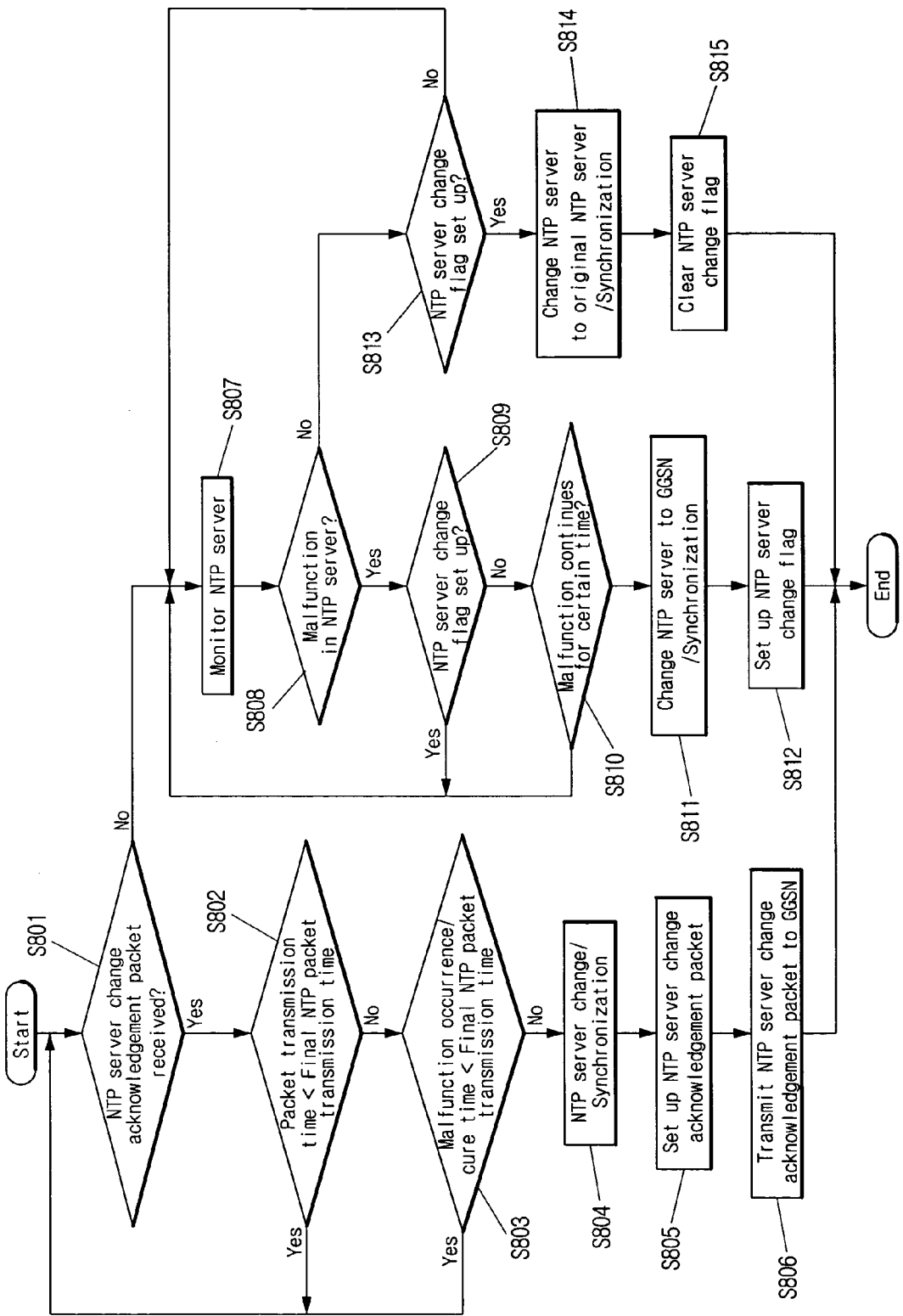
FIG. 8 is a flow chart illustrating the NTP server change and synchronization of FIG. 6.

FIG. 8 shows how the NTP server change and synchronization at the SGSNs 300 (S602) may be performed. First, the S-NTP Client 320 of each of the multiple SGSNs 300 determines whether it has received the NTP server change request packet (i.e., the first NTP server change request packet or the second NTP server change request packet) from the G-NTP Client 220 through the S-Interface 330 (S801).

If it is determined in S801 that the S-NTP Client 320 received the NTP server change request packet, the S-NTP Client 320 determines whether the packet transmission time set forth in the received NTP server change request packet is earlier than the transmission time of the final NTP packet (S802). In this connection, each of the SGSNs 300 receives timestamp from the NTP server 100 until any malfunction occurs in the NTP server 100 or after the malfunction is cured. On the other hand, while there is malfunction in the NTP server 100, the SGSNs 300 receive timestamp from the GGSN 200. For these operations, the packets exchanged between the SGSNs 300 and the NTP server 100 and between the SGSNs 300 and the GGSN 200 for the time distribution are the NTP packets. Of these NTP packets, the transmission time of the last packet is the final NTP packet's transmission time. The final NTP packet's transmission time indicates the time when the SGSNs 300 were last synchronized.

If it is determined in S802 that the packet transmission time of the NTP server change request packet is earlier than the final NTP packet's transmission time, the S-NTP Client 320 returns to the step of receiving the NTP server change request packet (S801).

If it is determined in S802 that the packet transmission time of the NTP server change request packet is not earlier than the final NTP packet's transmission time, the S-NTP Client 320 determines whether the malfunction occurrence/cure time in the NTP server change request packet is earlier than the final NTP packet's transmission time (S803).

Upon the determination (S803), if the malfunction occurrence/cure time in the NTP server change request packet is earlier than the final NTP packet's transmission time, the S-NTP Client 320 returns to the step of receiving the NTP server change request packet (S801).

Upon the determination (S803), if the malfunction occurrence/cure time in the NTP server change request packet is not earlier than the final NTP packet's transmission time, the S-NTP Client 320 changes the NTP server to the node having the IP address set forth in the NTP server change request packet (i.e., the GGSN 200 or the cured NTP server 100) and then receives a timestamp from the changed new NTP server, accomplishing the synchronization with the GGSN (S804).

A new NTP server means the node from which the SGSNs 300 will receive a timestamp. The GGSN 200 or the original NTP server 100 may become the new NTP server. If the node having the IP address is the GGSN 200, the GGSN 200 becomes the new NTP server and the SGSNs 300 receive a timestamp from the GGSN, accomplishing the synchronization with the GGSN 200. On the other hand, if the node having the IP address is the original NTP server 100, the original NTP server 100 becomes the new NTP server and the SGSNs 300 receive a timestamp from the original NTP server 100, accomplishing the synchronization with the GGSN 200.

Then, the S-NTP Client 320 sets up an NTP server change acknowledgement packet in response to the NTP server change request packet (S805). The NTP server change acknowledgement packet is preferably set up as illustrated in FIG. 5b. The message type field is set as "1" in order to indicate that the packet that the SGSNs 300 will transmit is for the NTP server change acknowledgement. If the NTP server change acknowledgement packet is in response to an NTP server change request packet to change the original NTP server 100 to the GGSN 200, the IP address field is set with the IP address of the GGSN 200. On the other hand, if the NTP server change acknowledgement packet is in response to an NTP server change request packet to change the GGSN 200 to the original NTP server 100, the IP address field is set with the IP address of the NTP server 100.

Thereafter, the S-NTP Client 320 transmits the NTP server change acknowledgement packet to the changed NTP server (i.e., the GGSN 200 or the restored NTP server 100) (S806).

If it is determined in S801 that no NTP server change request packet has been received, the S-NTP Client 320 of each of the SGSNs 300 monitors the NTP server 100 and the relevant range (S807) and determines whether any malfunction occurred in the NTP server 100 or if the malfunction has been cured (S808). The NTP server 100 that is monitored by the S-NTP Client 320 distributes a timestamp to the GGSN 200 and the SGSNs 300 on the entire network. The S-NTP client 320 monitors the NTP server 100 and its range periodically. The period of the monitoring is the same as the polling time when the S-NTP Client 320 of each of the SGSN 300 requests a timestamp.

Upon the determination in S808, if the NTP server 100 and its range experienced malfunction, the S-NTP Client 320 checks whether the NTP server change flag has been set up (S809). That the NTP server change flag has been set up in the S-NTP Client 320 means that the G-NTP Client 220 of the GGSN 200 is distributing a timestamp to the SGSNs 300 on the network instead of the NTP server 100 experiencing the malfunction.

If it is determined in S809 that the NTP server change flag has been set up, the S-NTP Client 320 returns to the step of monitoring the NTP server 100 (S807). In other words, because the S-NTP Client 320 has already been receiving a timestamp from the GGSN 200, the NTP server change to the GGSN 200 is not conducted.

In contrast, if it is determined in S809 that the NTP server change flag has not been set up, the S-NTP Client 320 determines whether the malfunction in the NTP server 100 continues for certain pre-determined time period (S810). The continuance of malfunction in the NTP server 100 for certain time period is determined if fault count exceeds certain number upon waiting some time while increasing the fault count.

If it is determined in S810 that the malfunction in the NTP server 100 has not continued for certain time period, the S-NTP Client 320 returns to the step of monitoring the NTP server 100 (S807).

If it is determined in S810 that the malfunction in the NTP server 100 continues for certain time period, the S-NTP Client 320 changes the NTP server and receives a timestamp from the changed NTP server (i.e., GGSN 220), thus accomplishing the synchronization with the GGSN 200 (S811). The changed NTP server means the node from which the SGSNs 300 receive the timestamp. The GGSN 200 is a node that may become the changed NTP server. Thus, the GGSN 200 becomes the changed NTP server and the SGSNs 300 receive the timestamp from the GGSN 200, thus accomplishing the synchronization with the GGSN 200.

Thereafter, the S-NTP Client 320 sets up the NTP server change flag (S812). The NTP server change flag is set up here in order to indicate that the S-NTP Client 320 is receiving a timestamp from the G-NTP Client 220 of the GGSN 200 instead of the NTP server 100 experiencing the malfunction.

If it is determined in S808 that the malfunction in the NTP server 100 has been cured, the S-NTP Client 320 determines whether the NTP server change flag has been set up (S813). That the NTP server change flag has been set up means that the G-NTP Client 220 of the GGSN 200 is still distributing a timestamp to the SGSNs on the entire network, even though the malfunction in the NTP server 100 has been cured.

Thus, if it is determined in S813 that the NTP server change flag has not been set up, the S-NTP Client 320 returns to the step of monitoring the NTP server 100 (S807). In other words, because the NTP server 100, not the G-NTP Client 220, is distributing a timestamp to the SGSNs 300, the S-NTP Client 320 does not conduct the NTP server change to the NTP server 100.

In contrast, if it is determined in S813 that the NTP server change flag has been set up, the S-NTP Client 320 changes the NTP server back to the original NTP server 100 and receives a timestamp from the original NTP server 100, thus accomplishing the synchronization with the GGSN 200 (S814). Here, the changed NTP server means the node from which the SGSNs 300 receive the timestamp and the original NTP server 100 is the node that may become the changed NTP server. Thus, the original NTP server 100 becomes the changed NTP server and the SGSNs 300 receive a timestamp from the original NTP server, synchronizing with the time of the NTP server 100. Consequently, the SGSNs 300 and the GGSN 200 are synchronized with the time of the NTP server 100.

Thereafter, the S-NTP Client 320 clears the NTP server change flag (S815). The NTP server change flag is cleared in order to indicate that the S-NTP Client 320 is receiving a timestamp from the restored original NTP server 100 instead of the G-NTP Client 220 of the GGSN 200.

FIG. 9 shows how confirmation at the GGSN 200 of the NTP server change (S603) may be performed. First, the G-NTP Client 220 of the GGSN 200 receives the NTP server change acknowledgement packet from the S-NTP Client 320 of each of the SGSNs 300 through the G-NTP Client 220 (S901).

Thereafter, the G-NTP Client 220 stores in the SGSN list the records about the response of the SGSNs 300 that transmitted the NTP server change acknowledgement packets (S902).

Then, the G-NTP Client 220 checks whether the time specified for the time signal has been passed (Time Out) (S903).

If it is determined in S903 that there has been no Time Out, the G-NTP Client 220 returns to the step of receiving the NTP server change acknowledgement packets (S901).

If it is determined in S903 that the Time Out has occurred, the G-NTP Client 220 determines whether the NTP server change acknowledgement packets have been received from all of the SGSNs 300 that received NTP server change request packets (S904).

If it is determined in S904 that not all of the NTP server change acknowledgement packets have been received, the G-NTP Client 220 transmit once again the NTP server change request packets to the S-NTP Clients 320 of the non-responding SGSNs 300 on the SGSN list through the G-Interface 230 (S905).

If it is determined in S904 that all of the NTP server change acknowledgement packets have been received, the G-NTP Client 220 checks whether the NTP server change flag has been set up (S906).

If it is determined in S906 that the NTP server change flag has been set up, the G-NTP Client 220 clears the NTP server change flag (S907). In other words, the G-NTP Client 220 clears the NTP server change flag in order to indicate that the NTP server that distributes timestamp to SGSNs 300 of the entire network has been changed from the G-NTP Client of the GGSN 200 to the original NTP server 100.

If it is determined in S906 that the NTP server change flag has not been set up, the G-NTP Client 220 sets up the NTP server change flag (S908). In other words, the G-NTP Client 220 sets up the NTP server change flag in order to indicate that the NTP server that distributes timestamp to SGSNs 300 of the entire network has been changed from the original NTP server 100 to the G-NTP Client of the GGSN 200.

As described above, if malfunction occurs in the NTP server, between the SGSNs and the NTP server or between the GGSN and the NTP server, the present invention monitors the malfunction and changes the NTP server, thus guaranteeing synchronization between the SGSNS and the GGSN until the malfunction is cured.

The foregoing embodiments and advantages are merely exemplary and are not to be construed as limiting the present invention. Many alternatives, modifications, and variations will be apparent to those skilled in the art.

What is claimed is:

1. A system for synchronizing SGSNs (Serving General Packet Radio Service (GPRS) Support Nodes) and a GGSN (Gateway GPRS Support Node), comprising:
   a GGSN that detects a malfunction in network time protocol (NTP) server, transmits an NTP server change request, and distributes a timestamp until the malfunction is cured; and
   one or more SGSNs that detect the malfunction occurring in the NTP server, and receive the timestamp from the GGSN in response to the NTP server change request from the GGSN.

2. The system of claim 1, wherein the GGSN comprises:
   a G-Interface which serves as an interface with each of the SGSNs through TCP/IP (Transmission Control Protocol/Internet Protocol) communication; and
   a G-NTP Client that detects the malfunction in the NTP server, transmits NTP server change request packets to the SGSNs through the G-Interface, and conducts synchronization with each of the SGSNs by distributing the timestamp to the SGSNs through the G-Interface.

3. The system of claim 2, wherein each of the NTP server change request packets comprises:
   a packet transmission time field indicating a time when the G-NTP Client transmitted packets;
   a malfunction occurrence/cure time indicating times when the malfunction occurred in the NTP server and was cured;
   an IP address field indicating an IP address of a node to be used as the NTP server; and
   a message-type field indicating that a packet transmitted by the G-NTP Client is for an NTP server change request.

4. The system of claim 1, wherein each of the SGSNs comprises:
   an S-Interface that serves as an interface with the GGSN or the other SGSNs through TCP/IP communication; and
   an S-NTP Client that detects the malfunction in the NTP server, changes from the NTP server to the GGSN upon receiving the NTP server change request from the GGSN through the S-Interface, transmits an NTP server change acknowledgement packet, and conducts synchronization with the GGSN by receiving the timestamp distributed by the GGSN.

5. The system of claim 4, wherein the NTP server change acknowledgement packet comprises:
   an IP address field indicating an IP address of the changed NTP server; and
   a message-type field indicating that the packet transmitted by the S-NTP Client is an NTP server change response.

6. A system for performing synchronization in a communication system, comprising:
   one or more SSGNs (Serving General Packet Radio Service (GPRS) Support Nodes) and a GGSN (Gateway GPRS Support Node) which are synchronized based on timestamp information received from an NTP server, wherein each of the SGSNs includes a client that:
   detects a malfhnction in the NTP server and performs an NTP server function of transmitting an the NTP server change request to the other SGSNs or the GGSN through the interface, and conducts synchronization with the other SGSNs or the GGSN by distributing a timestamp to the other SGSNs through the interface; and if the malfunction in the NTP server is cured, the client conducts synchronization with the recovered NTP server.

7. A method for synchronizing SGSNs (Serving General Packet Radio Service (GPRS) Support Nodes) and a GGSN (Gateway GPRS Support Node), comprising:
transmitting an an NTP server change request from the GGSN upon detecting a malfunction in the NTP server; and
changing one or more SGSNs to receive a timestamp from the GGSN in response to the NTP server change request, thereby synchronizing the GGSN and the SGSNs.

8. The method of claim 7, wherein said method further comprises:
detecting the malfunction in the NTP server or detecting that the malfunction has been cured;
when the malfunction in the NTP server has been detected, confirming that an NTP server change flag has not been set up and then checking whether the malfunction continues for a pre-determined duration;
if the malfunction continues for the pre-determined duration, setting up a first NTP server change request packet and generating an SGSN list by searching a database; and
transmitting the first NTP server change request packet to each of the SGSNs based on the SGSN list and then setting up a time signal.

9. The method of claim 8, wherein the first NTP server change request packet is packet for requesting change of the NTP server to the GGSN, the first NTP server change request packet including:
a packet transmission time field indicating a time when the GGSN transmitted a packet;
a malfunction occurrence time field indicating a time when the malfunction occurred in the NTP server;
an IP address field indicating an IP address of the GGSN; and
a message-type field indicating that the packet transmitted by the GGSN is for an NTP server change request.

10. The method of claim 8, wherein said requesting of NTP server change further comprises:
when the malfunction in the NTP server has been detected, confirming that an NTP server change flag has been set up and then setting up a second NTP server change request packet; and
generating a list of SGSNs by searching a database and then transmitting the second NTP server change request packet to each of the SGSNs based on the list and setting up a time signal at the same time.

11. The method of claim 10, wherein the second NTP server change request packet is a packet for requesting an the NTP server change from the GGSN back to the original NTP server, the second NTP server change request packet including:
a packet transmission time field indicating a time when the GGSN transmitted the packet:
a malfunction cure time field indicating a time when the malfunction in the NTP server was resolved;
an IP address field indicating an IP address of the NTP server; and
a message-type held indicating that the packet transmitted by the GGSN is an NTP server change request packet.

12. The method of claim 7, wherein said synchronizing of the GGSN and the SGSNs comprises:
checking, at each SGSN, an NTP server change request packet received from the GGSN;
determining whether a packet transmission time and a malfunction occurrence/cure time included in the NTP server change request packet is earlier than the transmission time of a final NTP packet or not;
changing the one or more SGSNs to receive a timestamp from the the GGSN or the NTP server corresponding to an IP address set NTP server change request packet, and at the same time setting up an NTP server change acknowledgement packet and transmitting it to the GGSN or the NTP server; and
receiving a timestamp distributed by the GGSN or the NTP server, thus synchronizing the GGSN and the SGSNs.

13. The method of claim 12, wherein the NTP server change acknowledgement packet comprises:
an IP address field indicating an IP address of the GGSN or the NTP server; and
a message-type field indicating that the packet that each SGSN transmits is for an NTP server change acknowledgement.

14. The method of claim 12, wherein said synchronizing of the SGSNs and the GGSN further comprises:
if no NTP server change request packet has been received, detecting at each SGSN the occurrence of malfunction in the NTP server or a cure of such malfunction;
if any malfunction has been detected in the NTP server, confirming that an NTP server change flag has not been set up and then determining whether the malfunction continues for a pre-determined time period;
if the malfunction continues for the pre-determined time period, changing the NTP server to the GGSN, and at the same time setting up an NTP server change request packet and transmitting it to the GGSN; and
receiving the timestamp from the GGSN, thus synchronizing the GGSN and the SGSNs, and then setting up the NTP server change flag.

15. The method of claim 14, wherein said synchronizing of the SGSNs and the GGSN further comprises:
if the cute of the malfunction in the NTP server has been detected, confirming at each SGSN that the NTP server change flag has been set up;
changing the NTP server from the GGSN back to the NTP server, and at the same time setting up an NTP server change acknowledgement packet and transmitting it to the NTP server; and
receiving the timestamp from the NTP server, thus, synchronizing the GGSN and the SGSNs, and then clearing the NTP server change flag.

16. The method of claim 12, wherein said synchronizing the GGSN and the SGSNs further comprises:
receiving at the GGSN the NTP server change acknowledgement packet from each SGSN and thus confirming the NTP server change.

17. The method of claim 16 said confirming the NTP server change comprises:
after receipt of the NTP server change acknowledgement packet from each SGSN at the GGSN, recording in the SGSN list whether there has been response from each of the SGSNs;
upon confirming a time-out of a time signal, detemtining whether the NTP server change acknowledgement packet has been received from every SGSN;
if the NTP server change acknowledgement packet has been received from every SGSN, checking whether the NTP server change flag has been set up; and setting up or clearing the NTP server change flag depending on whether the NTP server change flag has been set up.

18. A method for performing synchronization in a communication system, comprising:
transmitting an NTP server change request from a first SGSN (Serving General Packet Radio Service (GPRS) Support Node) to a GGSN (Gateway GPRS Support Node) or one or more other SGSNs when a malfunction in an NTP server is detected; and
distributing a timestamp from the first SGSN to the GGSN or the one or more other SGSNs to synchronize the first SGSN with the GGSN or the one or more other SGSNs based on the NTP server change request.

* * * * *